United States Patent
Bonanno et al.

(10) Patent No.: US 8,931,759 B2
(45) Date of Patent: Jan. 13, 2015

(54) LOW WEAR VALVE UNIT

(75) Inventors: Rosario Bonanno, Bad Soden (DE); Christian Weis, Budenheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/995,892

(22) PCT Filed: Dec. 19, 2011

(86) PCT No.: PCT/EP2011/073206
§ 371 (c)(1),
(2), (4) Date: Jun. 19, 2013

(87) PCT Pub. No.: WO2012/084796
PCT Pub. Date: Jun. 28, 2012

(65) Prior Publication Data
US 2013/0270470 A1    Oct. 17, 2013

(30) Foreign Application Priority Data
Dec. 20, 2010  (DE) .......................... 10 2010 055 254

(51) Int. Cl.
*F16K 31/04*     (2006.01)
*F02D 9/10*      (2006.01)
*F16D 3/04*      (2006.01)
*F02D 9/04*      (2006.01)

(52) U.S. Cl.
CPC ............. *F16K 31/041* (2013.01); *F02D 9/1065* (2013.01); *F16D 3/04* (2013.01); *F02D 9/04* (2013.01)
USPC ....................... 251/129.11; 251/292; 251/308

(58) Field of Classification Search
USPC ........ 251/129.11–129.13, 305–308, 292–293
See application file for complete search history.

(56) References Cited

U.S. PATENT DOCUMENTS

| | | | |
|---|---|---|---|
| 2,196,107 A * | 4/1940 | Dom ............................ | 251/366 |
| 6,598,619 B2 * | 7/2003 | Gagnon .................... | 251/129.11 |
| 6,646,395 B2 * | 11/2003 | Reimann .................. | 251/129.11 |
| 6,681,799 B2 * | 1/2004 | Gagnon ........................ | 251/305 |
| 6,997,163 B2 * | 2/2006 | Arai et al. ................ | 251/129.12 |
| 7,261,083 B2 * | 8/2007 | Kondo ........................... | 123/337 |
| 7,316,216 B2 * | 1/2008 | Neise et al. ................... | 123/337 |
| 7,428,892 B2 * | 9/2008 | Isogai et al. .................. | 251/305 |
| 7,434,781 B2 * | 10/2008 | Taylor et al. ................. | 251/293 |

(Continued)

FOREIGN PATENT DOCUMENTS

| | | |
|---|---|---|
| EP | 2 180 167 A1 | 4/2010 |
| JP | 2005-083443 A | 3/2005 |

(Continued)

*Primary Examiner* — John Bastianelli
(74) *Attorney, Agent, or Firm* — Cozen O'Connor

(57) ABSTRACT

A valve unit, having a housing, a flap, which is rotatably arranged in the housing and connected to a flap shaft supported in the housing, an electric motor for driving the flap shaft, and a transmission arranged between the electric motor and the flap shaft. A coupling, which consists of a flap-side component, an intermediate piece, and a transmission-side component is arranged between the flap shaft and a shaft of the transmission. At least one of the three coupling parts has at least two first holes of a same radial orientation. At least two second holes are arranged perpendicular to the first holes. Molded elements of an adjacent component of the coupling engage in the holes and the holes have a greater extension with respect to the radial orientation of the holes than the molded elements that engage in the holes.

10 Claims, 5 Drawing Sheets

(56) References Cited

U.S. PATENT DOCUMENTS

2007/0240676 A1* 10/2007 Sasaki ........................ 251/305
2008/0115494 A1* 5/2008 Willats et al. ................. 60/686
2010/0144452 A1 6/2010 Muenich et al.

FOREIGN PATENT DOCUMENTS

| WO | WO 2008/043600 A1 | 4/2008 |
| WO | WO 2010/103249 A1 | 9/2010 |

* cited by examiner

LOW WEAR VALVE UNIT

CROSS REFERENCE TO RELATED APPLICATIONS

This is a U.S. national stage of application No. PCT/EP2011/073206, filed on 19 Dec. 2011. Priority is claimed on German Application No. 10 2010 055 254.2 filed 20 Dec. 2010, the content of which is incorporated here by reference.

BACKGROUND OF THE INVENTION

1. Field of the Invention

The subject matter of the invention is a valve unit comprising a housing, a flap arranged rotatably in the housing and connected to a flap shaft is supported in the housing, an electric motor for driving the flap shaft, and a transmission arranged between the electric motor and the flap shaft.

2. Description of the Prior Art

Valves of this type are used, for example, as exhaust gas valves in motor vehicles and are known. Because of the high temperatures in the engine compartment or in the valve unit, thermally induced expansions occur, so that the shafts of the valve unit are no longer aligned accurately with respect to one another. The results are increased wear, which is detrimental to the service life of the valve unit, and the associated increased difficulty in transmitting the rotational movement from the electric motor to the flap, resulting in increased power consumption of the electric motor.

SUMMARY OF THE INVENTION

It is therefore an object of the invention to provide a valve unit that has low wear under thermal stresses.

According to one embodiment of the invention a coupling having a flap-side component, an intermediate piece, and a transmission-side component is arranged between the flap shaft and a shaft of the transmission, in that at least one of the three coupling parts has at least two first openings having the same radial orientation, in that at least two second openings are arranged to be aligned perpendicularly to the first openings, in that shaped elements of an adjacent component of the coupling engage in the openings and in that the openings have a greater extension, in relation to their radial orientation, than the shaped elements engaging therein.

The configuration of the coupling makes it possible for the shaped elements to move in a defined manner in the openings. The mutually perpendicular arrangement of the respective openings makes possible a radial relative movement in the x and y directions. An appropriately deep configuration of the openings and of the shaped elements makes possible an axial relative movement in the z direction. Consequently, the coupling allows an offset between the flap shaft and the opposite shaft of the transmission resulting from thermal stresses to be compensated. As a result of the compensation of the shaft offset by the coupling, the introduction of unwanted forces and moments into the transmission and the electric motor of the valve unit is avoided or reduced to a minimum.

In a simple configuration, all the openings are arranged in the intermediate piece and the shaped elements on the adjacent components, the shaped elements of a component each having the same radial orientation. Thus, the flap-side component has shaped elements oriented, for example, in the y direction while the shaped elements on the transmission-side component are oriented in the x direction.

In another configuration, the shaped elements of both radial orientations are arranged on the intermediate piece, shaped elements having the same radial orientation each being arranged on one side of the intermediate piece and engaging in the correspondingly oriented openings of the respective adjacent component.

The openings are formed especially simply if they are configured as open-ended or closed slots. With a large thickness of the corresponding coupling component, however, it may be advantageous to configure the openings simply as grooves which do not penetrate through the component.

The coupling components can be produced cost-effectively if at least one of the components of the coupling is made of metal or a metal alloy, preferably of sheet metal. Sheet metal parts, in particular, can be produced at low cost by stamping with optional subsequent reshaping. Configuration as a stamping is especially advantageous under high thermal stress.

In one embodiment at least one of the components of the coupling is made of plastics material, preferably produced by injection molding. The advantage of a plastics component lies in its low weight. Because of the lower thermal resistance of plastics as compared to metal, the intermediate piece and the transmission-side component are especially suited to being made of plastics. However, if the thermal stress is sufficiently low it is possible to produce the whole coupling from plastics material.

Since the relative movement between the individual components is small, the configuration of the openings and of the shaped elements engaging therein provides sufficient guidance during the relative movements. In assembling the coupling the individual components must be moved considerably more with respect to one another. Here, it has proven advantageous if at least one component of the coupling has guide elements for the relative movement with respect to the adjacent component. Additional protection against skewing is thereby achieved.

To further minimize the offset of the shafts it is advantageous according to a further configuration if at least one component of the coupling, preferably the flap-side component, additionally has at least one spacer against which the adjacent component of the coupling abuts. The spacer has the advantage that it separates two adjacent components which would otherwise rest against one another in a planar manner. As a result of this separation of the components direct thermal conduction is interrupted, whereby the thermal stress on the component arranged further towards the transmission is substantially lowered.

In this case the spacer may be a separate part connected to the corresponding coupling component. In a low-cost configuration, the spacer is connected integrally to the coupling component. A further simplification with simultaneous saving of installation space is achieved if the spacer is integrated in other functional elements, for example a guide. In this case such a guide would guide the adjacent coupling component at a distance from its own coupling component.

BRIEF DESCRIPTION OF THE DRAWINGS

The invention is explained in more detail with reference to two exemplary embodiments. In the drawings.

DETAILED DESCRIPTION OF THE PREFERRED EMBODIMENTS

Figure 1:
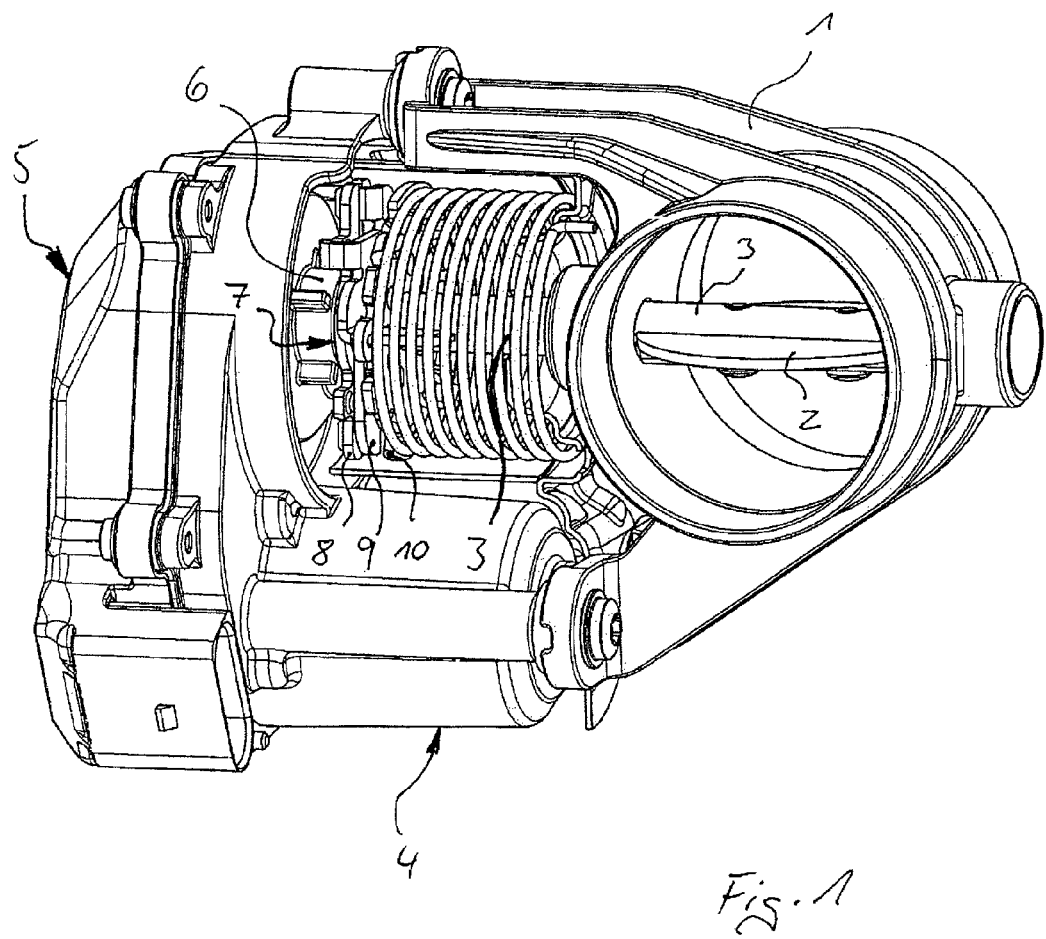
FIG. 1 is an exhaust gas valve of a motor vehicle.

The valve unit in FIG. 1 is an exhaust gas valve comprising a housing 1, a flap 2 arranged rotatably in the housing 1 and connected to a flap shaft 3 supported in the housing 1. An electric motor 4 arranged in a separate chamber of the housing 1 drives the flap shaft 3. The rotary motion of the electric motor 4 is transmitted to the flap shaft 3 via a transmission 5 arranged between the electric motor and the flap shaft. A coupling 7 is arranged between the flap-side output 6 of the transmission and the flap shaft 3. The coupling 7 consists of a transmission-side component 8, an intermediate piece 9 and a flap-side component 10.

Figure 2:
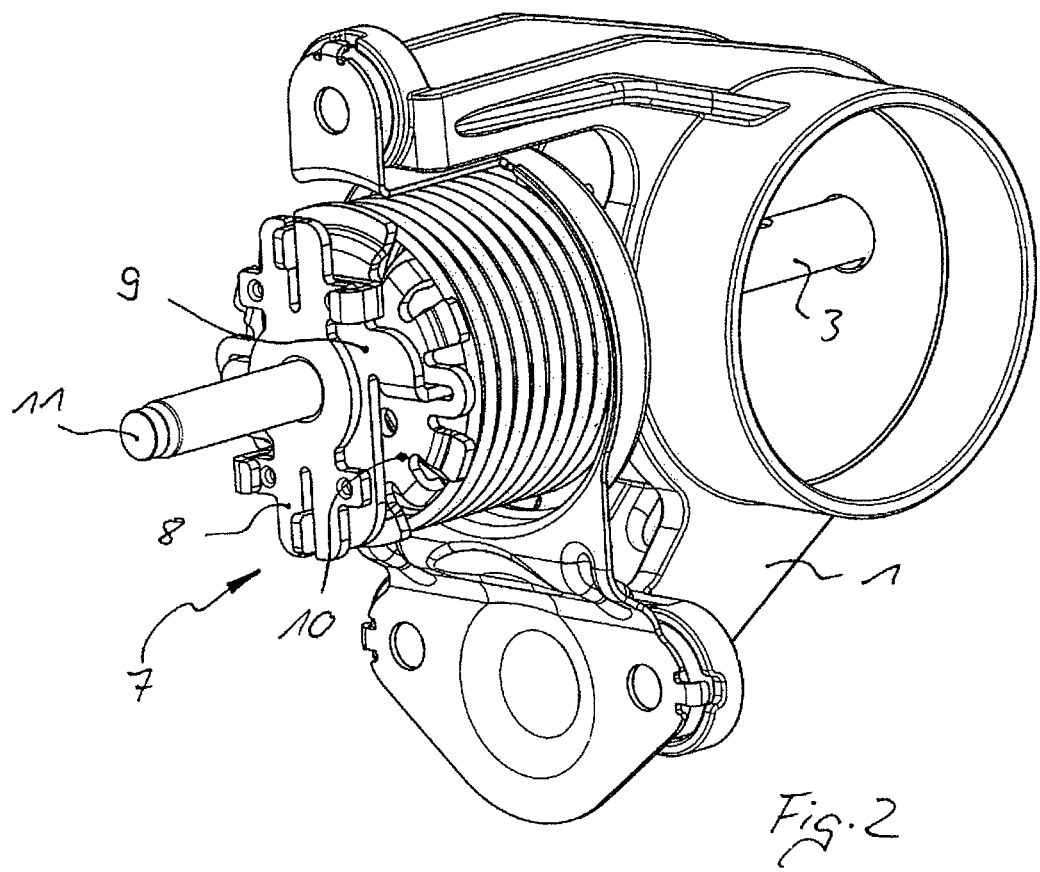
FIG. 2 is a portion of the valve unit from FIG. 1.

FIG. 2 shows the valve unit without the transmission 5. Only the shaft 11 of the transmission 5 forming the flap-side output 6 is shown. The shaft 11 is rigidly connected to the transmission-side component 8 of the coupling 7. The flap-side component 10 is rigidly connected to the flap shaft 3. The structure of the coupling 7 is described in the following figures.

Figure 3:
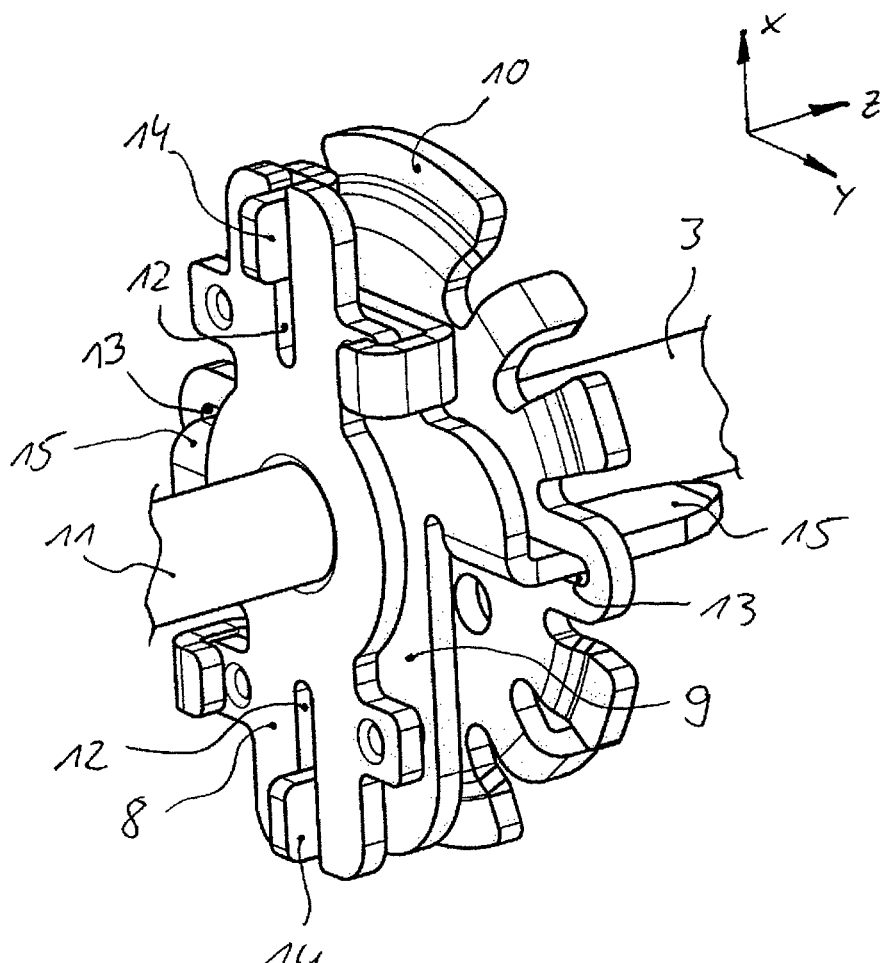
FIG. 3 is a coupling of the valve unit.

The coupling 7 in FIG. 3 shows the transmission-side component 8 with the shaft 11, the intermediate piece 9 and the flap-side component 10 with the flap shaft 3. The component 8 has two first openings 12 having the same radial orientation, which are formed as open-ended slots in the component 8. The component 10 has two second openings 13 having the same radial orientation, which are formed as closed slots in the component 10. The openings 13 are oriented perpendicularly to the openings 12. The intermediate piece 9 has two shaped elements 14 having the same radial orientation formed on one side of the intermediate piece 9 and which engage in the openings 13 of the component 8. Two further shaped elements 15 which have the same orientation and engage in the openings 13 of the component 10 are formed on the opposite side of the intermediate piece 9. The openings 12, 13 have a greater radial extension than the shaped elements 14, 15, so that in the event of a thermally induced offset of the flap shaft 3 with respect to the shaft 11, the shaped elements 14, 15 can move in the openings 13, 12, leading to relative movement between the coupling components 8, 9, 10. The slots 12 permit movement in the x direction while the slots 13 permit movement in the y direction. In addition, because of the axial extension of the shaped elements 14, 15, a relative movement of the coupling components 8, 9, 10 in the z direction is possible.

Figure 4:
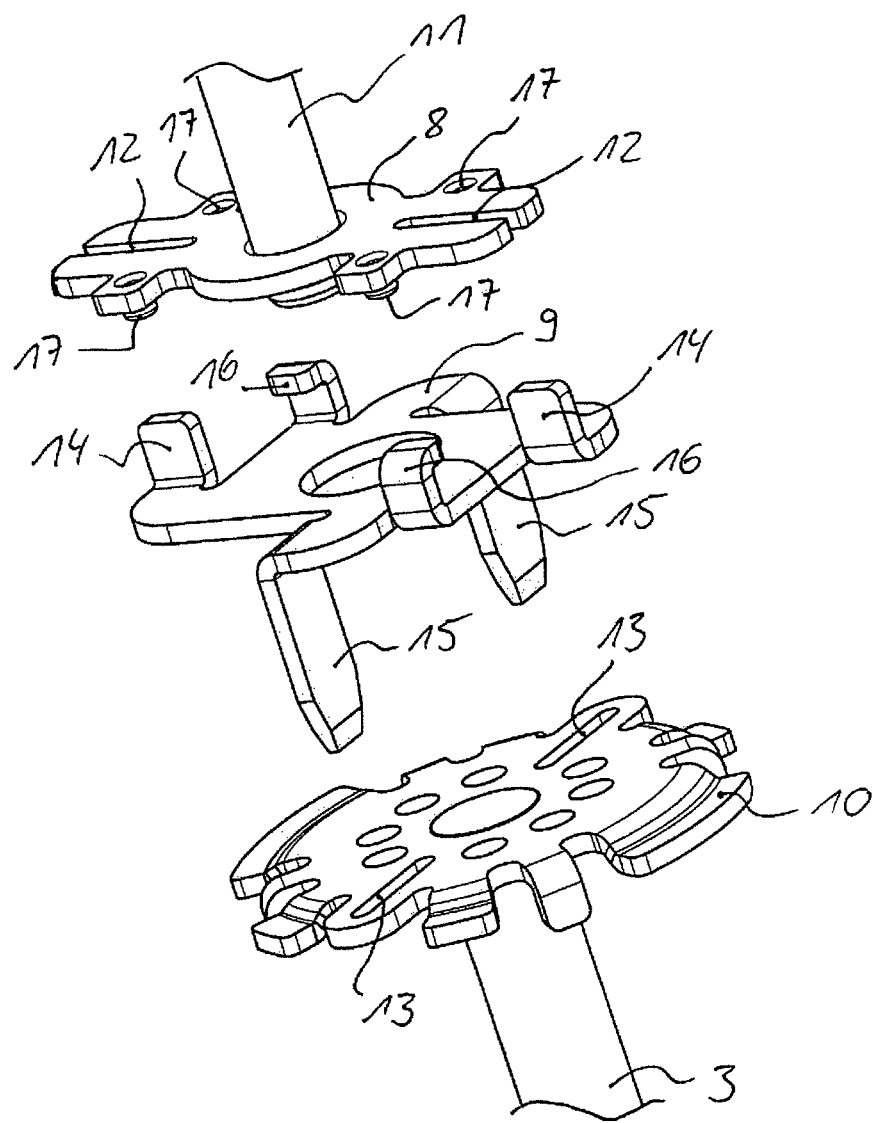
FIG. 4 is the coupling in an exploded representation.

FIG. 4 shows the coupling components 8, 9, 10 with the shaped elements 14, 15 and the openings 12, 13. The coupling components 8, 9, 10 are made of metal and are produced as sheet metal parts by stamping and reshaping. Furthermore, two guides 16, which encompass the transmission-side component 8 in the region of the openings 12, are formed on the intermediate piece 9. Four spacers 17 produced by embossing the component 8 are arranged on the component 8. It is also possible, however, to insert the spacers 17 as pegs in the component 8. The spacers prevent planar abutment of the component 8 on the intermediate piece 9, whereby heat transfer between the two coupling parts 8, 9 is reduced to a minimum.

Figure 5:
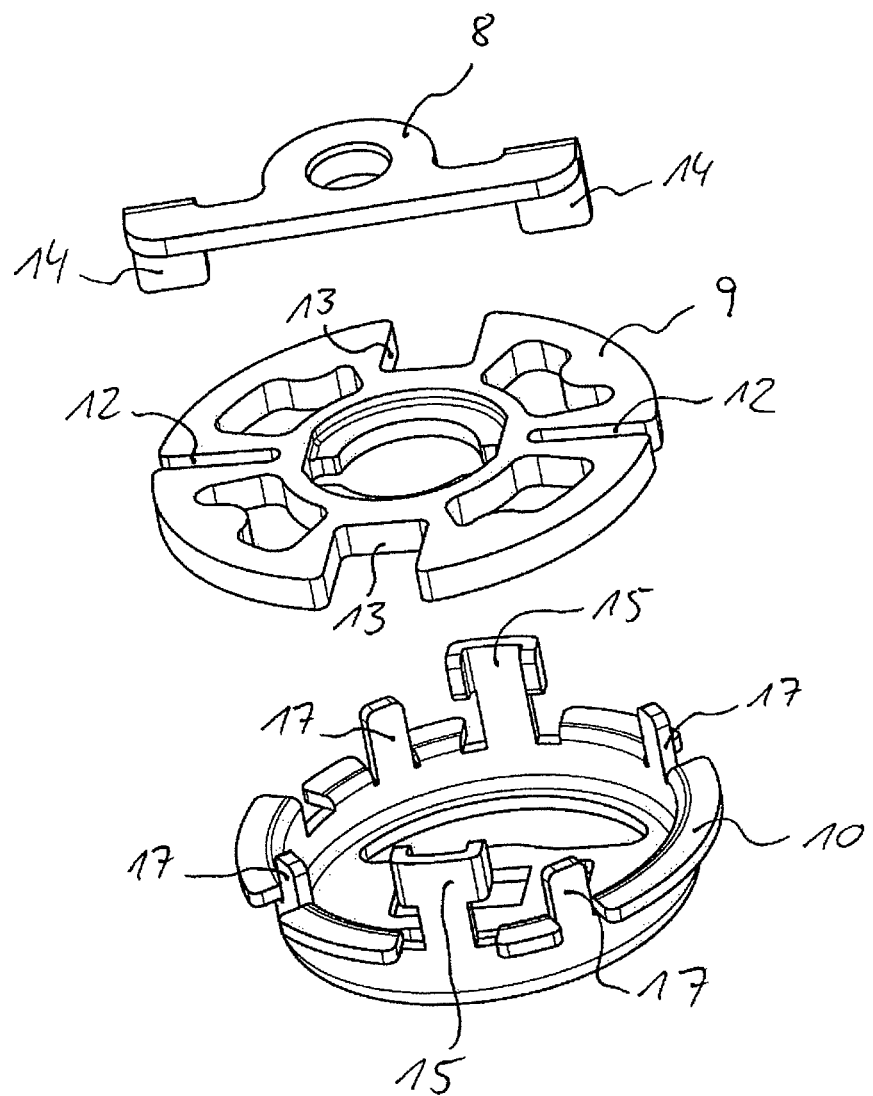
FIG. 5 is a second embodiment of the coupling.

FIG. 5 shows a coupling 7 without the shafts. The openings 12, 13 are arranged in the intermediate piece 9, and the shaped elements 14, 15 having the same radial orientation in each case are arranged on the corresponding components 8, 9. The spacers 17 are formed on the flap-side component 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve unit, comprising
a housing;
a flap shaft supported in the housing;
a flap arranged rotatably in the housing and connected to the flap shaft;
an electric motor configured to drive the flap shaft;
a transmission arranged between the electric motor and the flap shaft; and
a coupling arranged between the flap shaft and a shaft of the transmission comprising three coupling parts:
a flap-side component;
transmission-side component; and
an intermediate piece arranged, between the flap-side component and the transmission side component,
wherein at least one of the flap-side component and the transmission-side component has at least two first openings having a same radial orientation,
wherein the other of the flap-side component and the transmission-side component has at least two second openings are arranged to be aligned perpendicularly to the first openings,
wherein the intermediate piece comprises shaped elements that engage in the respective first and second openings and in that the first and second openings have a greater extension in relation to their radial orientation than the shaped elements engaging therein.

2. The valve unit as claimed in claim 1, wherein the first and second openings are one of open-ended and closed slots.

3. The valve unit as claimed in claim 2, wherein the first and second openings are grooves in the respective component.

4. The valve unit as claimed in claim 1, wherein at least one of the coupling parts of the coupling is one of metal and a metal alloy.

5. The valve unit as claimed in claim 1, wherein at least one of the coupling parts of the coupling is made of plastics material.

6. The valve unit as claimed in claim 1, wherein at least one coupling parts of the coupling has guide elements for relative movement with respect to the adjacent component.

7. The valve unit as claimed in claim 1, wherein at least one of the coupling parts of the coupling has at least one spacer against which the adjacent component of the coupling abuts.

8. The valve unit as claimed in claim 4, wherein the at least one metal and the metal alloy is a sheet metal.

9. The valve unit as claimed in claim 4, wherein at least one of the coupling parts of the coupling is sheet metal.

10. The valve unit as claimed in claim 1, wherein the the flap-side component and the transmission-side component are substantially planar.

* * * * *